United States Patent
Green et al.

(10) Patent No.: US 8,627,000 B2
(45) Date of Patent: Jan. 7, 2014

(54) VIRTUAL DISK MANIPULATION OPERATIONS

(75) Inventors: Dustin L. Green, Redmond, WA (US); Jacob K. Oshins, Seattle, WA (US); Michael L. Neil, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 475 days.

(21) Appl. No.: 12/701,626

(22) Filed: Feb. 8, 2010

(65) Prior Publication Data

US 2011/0197022 A1  Aug. 11, 2011

(51) Int. Cl.
*G06F 12/00* (2006.01)

(52) U.S. Cl.
USPC ........... 711/112; 711/162; 711/E12.001; 711/E12.103; 710/58

(58) Field of Classification Search
None
See application file for complete search history.

(56) References Cited

U.S. PATENT DOCUMENTS

| | | | |
|---|---|---|---|
| 4,455,602 A * | 6/1984 | Baxter et al. ................ 710/5 |
| 4,464,713 A * | 8/1984 | Benhase et al. .............. 711/205 |
| 5,634,096 A | 5/1997 | Baylor et al. |
| 5,926,834 A | 7/1999 | Carlson et al. |
| 5,987,565 A | 11/1999 | Gavaskar |
| 6,046,930 A * | 4/2000 | Ciraula et al. ............... 365/156 |
| 6,247,099 B1 * | 6/2001 | Skazinski et al. ............ 711/141 |
| 6,505,260 B2 * | 1/2003 | Chin et al. .................... 710/41 |
| 6,880,062 B1 * | 4/2005 | Ibrahim et al. .............. 711/202 |
| 6,934,799 B2 | 8/2005 | Acharya et al. |
| 7,039,783 B2 * | 5/2006 | Koo .............................. 711/168 |
| 7,080,051 B1 * | 7/2006 | Crawford .................... 709/219 |
| 7,447,854 B1 | 11/2008 | Cannon |
| 7,529,784 B2 | 5/2009 | Kavuri et al. |
| 7,631,155 B1 * | 12/2009 | Bono et al. .................. 711/156 |
| 7,873,619 B1 * | 1/2011 | Faibish et al. ................ 707/705 |
| 8,368,686 B2 * | 2/2013 | Sommers ..................... 345/420 |
| 2002/0184463 A1 * | 12/2002 | Arakawa et al. ............ 711/170 |
| 2004/0139097 A1 * | 7/2004 | Farber et al. ................. 707/100 |
| 2005/0195660 A1 * | 9/2005 | Kavuri et al. ............ 365/189.05 |
| 2006/0101204 A1 * | 5/2006 | Bao .............................. 711/114 |
| 2006/0155667 A1 | 7/2006 | Tolba |
| 2006/0161753 A1 | 7/2006 | Aschoff et al. |
| 2008/0028052 A1 * | 1/2008 | Currid et al. ................. 709/222 |
| 2008/0104334 A1 * | 5/2008 | Bellaton et al. .............. 711/141 |
| 2008/0144471 A1 | 6/2008 | Garapati et al. |
| 2008/0301123 A1 * | 12/2008 | Schneider et al. ................ 707/5 |
| 2008/0307191 A1 | 12/2008 | Lane et al. |
| 2009/0070345 A1 * | 3/2009 | Kazar et al. .................. 707/10 |

(Continued)

OTHER PUBLICATIONS

Ariyamannil et al. "The Veritas™ Cluster File System: Technology and Usage." Symantec Yellow Books™, Jan. 2010.*

(Continued)

*Primary Examiner* — Alford W. Kindred
*Assistant Examiner* — Daniel Bernard
(74) *Attorney, Agent, or Firm* — Gonzalez Saggio & Harlan LLP

(57) ABSTRACT

Described is a technology by which a virtual hard disk is able to continue servicing virtual disk I/O (reads and writes) while a meta-operation (e.g., copying, moving, deleting, merging, compressing, defragmenting, cryptographic signing, lifting, dropping, converting, or compacting virtual disk data) is performed on the virtual disk. The servicing of virtual disk I/Os may be coordinated with meta-operation performance, such as by throttling and/or prioritizing the virtual disk I/Os. Also described is performing a meta-operation by manipulating one or more de-duplication data structures.

20 Claims, 6 Drawing Sheets

(56) References Cited

U.S. PATENT DOCUMENTS

| | | | |
|---|---|---|---|
| 2009/0119538 A1 | 5/2009 | Scales et al. | |
| 2009/0193298 A1* | 7/2009 | Mukherjee | 714/38 |
| 2009/0300023 A1* | 12/2009 | Vaghani | 707/10 |
| 2009/0319256 A1* | 12/2009 | Chow et al. | 703/26 |
| 2010/0049750 A1* | 2/2010 | Srivastava et al. | 707/202 |
| 2010/0049927 A1* | 2/2010 | Fuente et al. | 711/162 |
| 2010/0082714 A1* | 4/2010 | Herron et al. | 707/822 |
| 2011/0055471 A1* | 3/2011 | Thatcher et al. | 711/114 |
| 2011/0137724 A1* | 6/2011 | Ramchandran et al. | 705/14.49 |
| 2011/0213927 A1* | 9/2011 | Tucci | 711/114 |

OTHER PUBLICATIONS

Shahzad Shafkat, "Managing VMware Server 2.0 Virtual Disks", Retrieved at<<http://www.chutneytech.com/managing-vmware-server-20-virtual-disks/>>,Feb. 16, 2009, pp. 5.

Rambo, et al., "Windows Boot from Virtual Disk", Retrieved at<<http://download.microsoft.com/download/8/6/A/86A97515-8AF4-4CA6-B516-CDA1139B8D93/ENT-T606_en.pptx>>,2008, pp. 31.

"Vdisk", Retrieved at<<http://en.wikipedia.org/wiki/Vdisk>>, Sep. 10, 2009, p. 1.

"International Search Report", Mailed Date: Aug. 30, 2011, Application No. PCT/US2011/021443, Filed Date: Jan. 16, 2011, pp. 9.

\* cited by examiner

VIRTUAL DISK MANIPULATION OPERATIONS

BACKGROUND

A virtual disk is basically a set of one or more files or other storage extent (e.g., a disk, partition on a disk or the like) that is configured to operate as if it were a physical hard disk drive for a computer system. Virtual disk input and output ("I/O" comprising reads and writes to a virtual disk) manipulate virtual disk data. Various aspects of a virtual disk's data also are manipulated by "meta-operations," including operations that create and delete snapshots, create and delete checkpoints, change where data is stored, delete unused data, and so forth.

Because virtual disk I/O and meta-operations both write to a virtual disk, there is the potential for a meta-operation to conflict with a virtual disk I/O, causing data corruption. A straightforward approach to avoiding such potential corruption problems is to disallow meta-operations while the virtual disk is in use as a disk for servicing virtual disk I/O. However, this approach is not desirable because it limits the scenarios in which meta-operations can be used. A solution is needed that allows meta-operations to safely proceed while a virtual disk is in use as a disk.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a virtual disk comprising at least two overlapping layers can continue to be used for servicing virtual disk I/O (reads and writes) while a meta-operation with its own I/O is performed on the virtual disk. This includes preventing at least some meta-operation writes to a virtual disk offset range concurrent with virtual disk writes to an overlapping virtual disk offset range.

Example meta-operations comprises copying, moving, deleting, merging, compressing, defragmenting, cryptographic signing, lifting, dropping, converting, or compacting virtual disk data. The meta-operation may manipulate less than all of the virtual disk data.

In one aspect, the servicing of virtual disk I/Os is coordinated with meta-operation performance to allow the meta-operation to complete, to control virtual disk reads and writes versus meta-operation reads and writes, and/or to control interference of the meta-operation with other data traffic. For example, virtual disk reads and writes may be throttled and/or prioritized to allow the meta-operation to complete. Also, the meta-operation reads and writes may be throttled and/or prioritized to control interference with virtual disk reads and writes, and/or to control interference of the meta-operation with other data traffic.

In one aspect, the meta-operation may be performed by manipulating one or more de-duplication data structures rather than actually copying or moving data, such as to compact the virtual disk, defragment the virtual disk, merge two or more layers of the virtual disk, convert the virtual disk to a different layout, lift the virtual disk, or drop the virtual disk. If possible, the meta-operation is performed by a copy offload operation, update operation, delete operation, and/or move offload operation. Both payload data and metadata may be manipulated.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards performing meta-operations on a virtual disk while the virtual disk is in-use as a disk, in a manner that avoids corruption that may otherwise occur if meta-operation data changes were allowed to mix with virtual disk reads and writes. Also described are multiple mechanisms that allow certain meta-operations to manipulate only a portion of the virtual disk data, instead of all the virtual disk data. Still further, dynamic movement of data and movement of the servicing of virtual disk reads and writes while a meta-operation is ongoing are described, in a manner that does not unduly impact other communications traffic.

It should be understood that any of the examples described herein are non-limiting examples; for example, virtual disks comprised of one or more layers are described herein, however, other arrangements that provide virtual disks may be used. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing and data storage in general.

Figure 1:
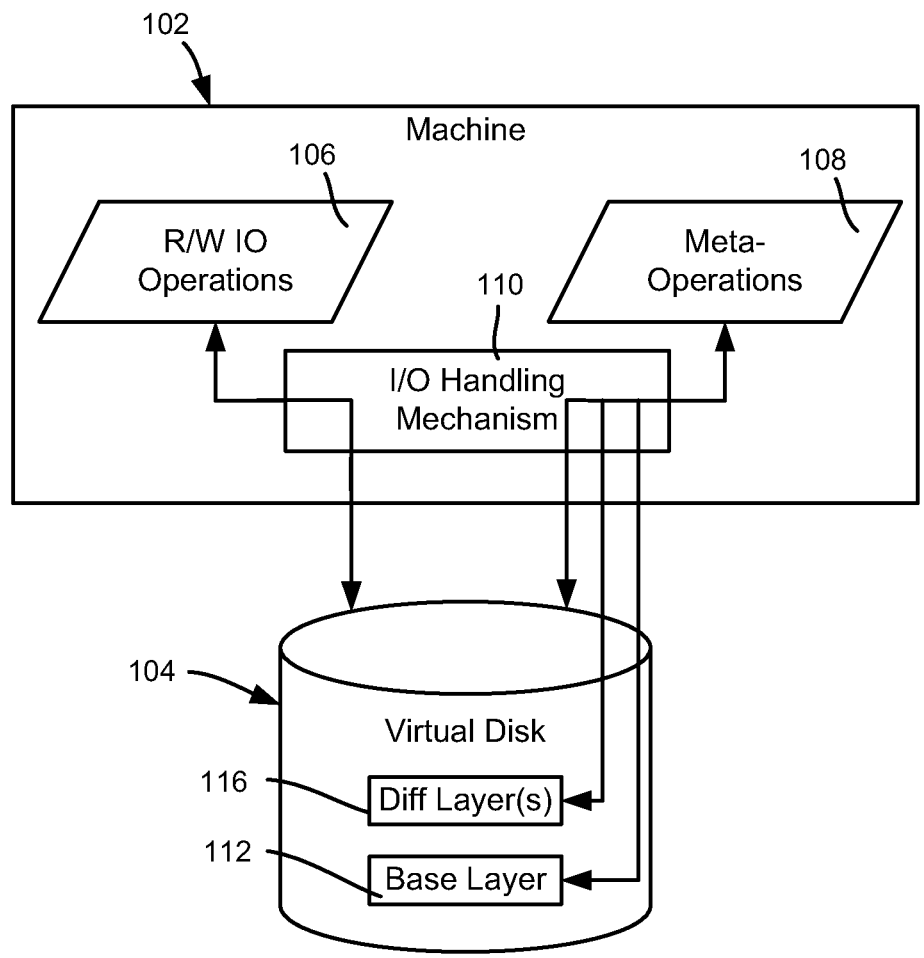
FIG. 1 is a block diagram showing an example of a mechanism that allows a virtual disk to continue to service reads and writes while performing one or more meta-operations on the virtual disk.

FIG. 1 shows a computing environment in which a computing machine 102 (physical or virtual) is coupled to a virtual disk 104. Although FIG. 1 shows a single component representing the virtual disk 104, it should be noted that a virtual disk's data may be located in a single physical storage device, or distributed among more than one physical storage device, including devices at physically separate locations (e.g., remote and/or local).

Moreover, while FIG. 1 shows one physical or virtual machine 102 using the virtual disk 104, more than one such machine may use it, and different machines may do so at different times. The machine or set of machines using the virtual disk (as a virtual disk) may change before, during, or after the meta-operation data manipulation. The machine using the virtual disk as a virtual disk is not required to be the same machine that is servicing virtual disk I/Os (reads and writes). However, in one implementation, the machine servicing virtual disk I/Os is the same machine that is performing a meta-operation. In one implementation, servicing of virtual disk I/Os and ongoing performance of the meta-operation move together to a different machine (if they move at all). Note that a virtual disk meta-operation may continue toward completion even as the usage of the virtual disk moves from one machine to another In general, the virtual disk services read and write (R/W) input and output (I/O) operations 106 made by applications and operating system components and services, for example. Other commands that may be serviced include (but are not limited to) flush, unmap, copy offload. The virtual disk also has its data manipulated via meta-operations 108, described below, such as initiated by utility applications and/or operating system components and services. Example virtual disk meta-operations include those that create and delete snapshots, create and delete checkpoints, change where data is stored, delete unused data, modify de-duplication data structures, and so forth. As described below, an I/O handling mechanism 110 ensures correct disk semantics, including by handling conflicts such that older data cannot overwrite more recently written data, and such that older data is not read (e.g., from one layer) when newer data has been written (e.g., to another layer).

The virtual disk 104 may be constructed from one or more layers (which may be files) of backing data, as represented in FIG. 1 via the base layer 112 and differencing (diff) layer or layers 116. Note however that a simple virtual disk may have only one "layer" of backing store data, with both reads and writes being serviced from this single layer. Note that as represented in FIG. 1, virtual disk I/O operations 106 are directed to the virtual disk 104, while meta operations 108 may be directed to the virtual disk 104, the diff layer 116, and/or the base layer 112.

In general, a multiple-layer virtual disk has its contents formed by overlaying the diff layer (or layers) in a top-down order over the base layer, such that any data in the topmost diff layer is used when present, and if not, then the data of the next diff layer (if any) and so on, until the base layer data is reached. In one implementation, the base layer is read only, with any writes made to the topmost diff layer. Note that such layers may be on different physical storage devices, and that any given layer may also be distributed among more than one storage device.

Each layer has a possibly-sparse representation of data that exists at offsets of the virtual disk 104. When a read from the virtual disk occurs, the read is translated into corresponding reads of the backing data corresponding to the requested virtual block device offset range. Note that if the backing data is sparsely represented, it is possible that a read will be from one or more offsets that do not currently have any backing store data, in which event the read may be serviced by filling the read buffer with zeroes. Writes are serviced by translating virtual disk offsets and performing corresponding writes to the backing data, possibly requiring a new region of backing data to be created before the new region is written.

Figure 2:
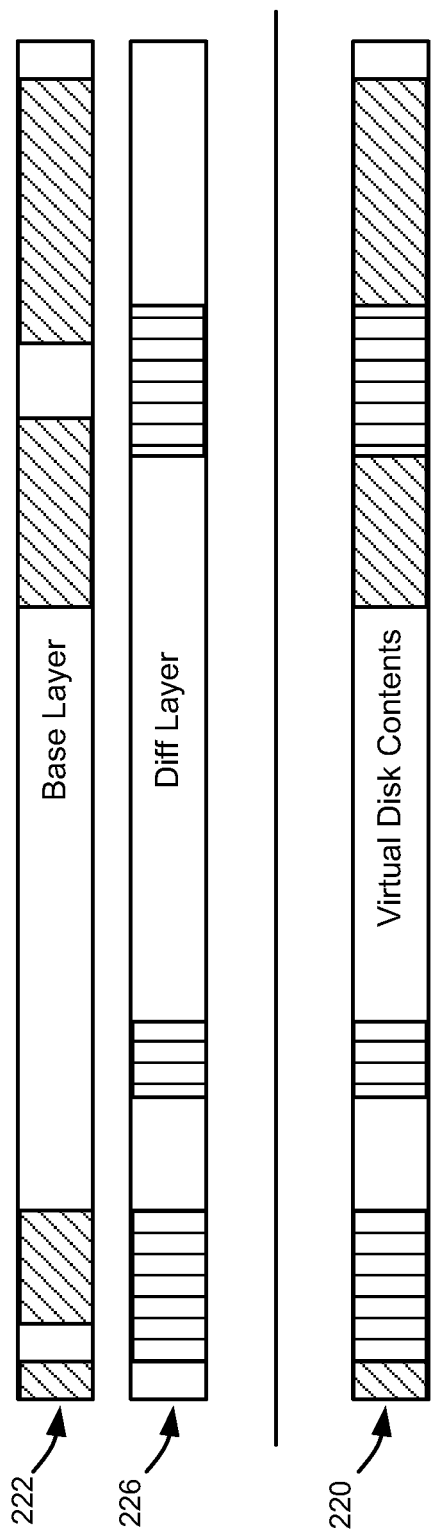
FIG. 2 is a representation of a two-layered virtual disk that may be used to maintain the virtual storage disk's data via a base layer and a diff (differencing) layer.

FIG. 2 is an example of a virtual disk 220 with two layers 222 and 226, namely a base layer 222 overridden by a diff layer 226 at any offset range where the diff layer 226 has data. The virtual disk contents are thus formed by using the data of the diff layer 226 wherever such data exists, and then using the data of the base layer 222 when no diff layer data exists. The diff layer contains the written data. Note that it is feasible to write the diff layer's data back to the base layer if the base layer is not read-only; once a region of the diff layer is written back to the base layer, the diff layer region may then be deleted if desired.

Figure 3:
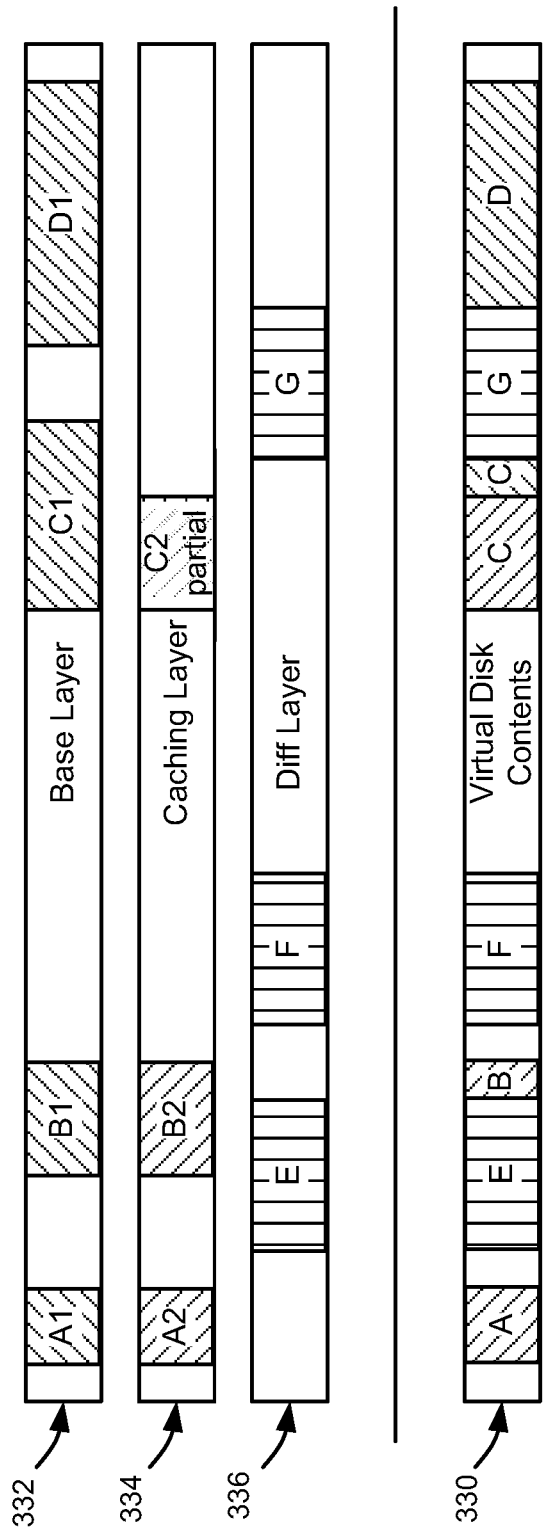
FIG. 3 is a representation of a three-layered virtual disk that may be used to provide the virtual storage disk's data.

FIG. 3 shows a virtual disk 330 with three layers. In addition to a diff layer 336 that represents the write data, and an underlying base layer 332, this virtual disk 330 includes a caching layer 334. The caching layer 334 may be used to represent some or all of the data copied from or previously read from the base layer 332; for example if the base layer is remotely located, more efficient access may be obtained by reading the local cache layer 334 wherever it has data, and only accessing the base layer when the local cache layer 334 does not have data. A read may be partially from the caching layer 334 and partially from the base layer 332, or partially from the diff layer 336, partially from the caching layer 334 and partially from the base layer 332.

Other layering arrangements may be implemented. For example, there may be multiple layers in time order comprising snapshots of the virtual disk data as it existed at various times, such as a base layer at time T0, one or more diff layers at time T1-Tn that are snapshotted into one or more read-only diff layers, and a topmost diff layer that tracks current writes since the last snapshot. The stacking order of diff layers need not correspond to the time order in which the snapshots were created. Writes may be allowed to middle diff layers by first copying any ranges present in the targeted diff layer that are not already present in the adjacent (further toward the top in this description) diff layer into the adjacent diff layer, before the write is allowed to proceed.

In any arrangement including those of FIG. 2 or FIG. 3, data in each diff layer overrides data in any lower layer, down to the base layer, offset by offset. In other words, if the topmost diff layer has data for a given offset, that data is the official data for that offset of the virtual storage device, regardless of what any other layer (including the base layer) contains for that offset. The other layer or layers may be used, in a top-down ordering, to service reads of any offsets not represented with data in the topmost diff layer. If no layer has data for a given offset, reads at that offset will return zeros. Reads may be serviced partially from one layer, and partially from a lower layer, depending on which parts of the read range is represented in each layer. Writes are serviced entirely by writing to the topmost diff layer, although they also may be propagated back to other layers (including the base layer) if desired, as long as any such layer is not read-only in a given implementation. In such write-through cases, the layers above the write-through layer need to have the corresponding virtual disk offset removed, or written with the same data as the write to the write-through layer.

As described herein, the virtual disk data may be manipulated by meta-operations while the virtual disk is concurrently being used as a disk for I/Os. Correct disk semantics are maintained by having the I/O handling mechanism 110 prevent meta-operation manipulation writes of data backing a virtual disk offset range concurrent with virtual disk writes of an overlapping virtual disk offset range. Virtual disk reads and writes are thus protected from changes made by meta-operations.

Meta-operation manipulation may comprise copying, moving, deleting, compressing, or other operations on virtual disk data. Another potential meta-operation is per-block cryptographic signing. One example purpose of copying or moving can be to merge data from a diff layer into a base layer. An example purpose of deleting is to remove data which is no longer used by a file system residing on the virtual disk. De-duplication is another meta-operation that reduces redundant data, for example.

Note that different meta-operations can work through their portion of virtual disk data in different ways. For example, a merge meta-operation may process virtual disk data in virtual disk offset order, whereas a layer-copy operation may work through virtual disk data in storage-location order, such as in file-storage-location order or file system cluster storage location order.

By way of a particular example "merge" meta-operation, consider a disk with two layers as in FIG. 2. In general, the merge meta-operation writes diff layer data to the base layer 226, and then deletes that diff layer data, resulting in a base layer that represents the virtual disk in each merged region. Because a disk offset is a one-dimensional quantity, the virtual disk contents 220 represent only a one-dimensional sequence of data blocks present on the virtual disk, and the diff layer can overlay and replace some of the data blocks.

A merge operation normally fuses the data such that the diff layer's data overwrites anything on the base layer 222 in the same virtual disk offset location. To achieve this, an actual sequence of operations for merge is to read a block that is present in the diff layer 226, write that block of data to the base layer 222, and delete the block from the diff layer 226. However, consider that at the same time, a disk write to the virtual disk is issued to the block's location on the virtual disk. If the merge operation is not ongoing, then the write as is typical gets written to the diff layer 226, overwriting anything that was in the diff layer 226. This data then supersedes (overrides) anything that is in the base layer 222 at that location.

During a merge meta-operation, writes may be configured to target either the diff layer or the merge target layer (which in this example is the base layer). If the virtual disk write targets the diff layer, a problem arises if newly written data is lost because of the merge meta-operation, e.g., if the order of sub-operations is as follows:

1) The merge meta-operation reads any old data from the diff layer.
2) A virtual disk write overwrites data in the diff layer with new data.
3) The merge meta-operation writes the old data to the base layer.
4) The merge meta-operation deletes the new data from the diff layer.

In an alternative example, written data may be lost because of a merge meta-operation when virtual disk writes are configured to write to the base layer (instead of the diff layer):

1) The merge meta-operation reads old data from the diff layer.
2) A virtual disk write writes new data to the base layer.
3) The virtual disk write also deletes any data in the diff layer whereby no data exists in the diff layer (so that there is no diff layer data that can supersede the newly written data).
4) The merge meta-operation writes the old data to the base layer (and thus overwrites the new data written by the virtual disk write).
5) The merge meta-operation tries to delete old data from the diff layer (although there is none).

Note that these are only two possible variations of example problems inherent in performing meta-operations at the same time as virtual disk writes. Further note that one approach to solving such problems is to simply prevent meta-operation reads and writes from occurring concurrently with virtual disk reads and writes, regardless of read versus write, and regardless of whether the operations share any sectors in common. However, this approach is unnecessarily conservative, and unnecessarily slows down (or stops) virtual disk I/O for the duration of the overall meta-operation.

To avoid these problems, the I/O handling mechanism 110 allows a meta-operation virtual disk I/O to operate on the same virtual disk at the same time as other writes, but not at the same offset of the virtual disk 104 at the same time. In one implementation, the I/O handling mechanism 110 does not allow a meta-operation and a virtual disk I/O to concurrently access (perform any concurrent reading or writing of) the same offset/region of the virtual disk. In other words, meta-operation reads and writes are prevented from occurring concurrently with virtual disk reads and writes that share sectors (or the like) in common. This only impacts performance on virtual disk I/Os that actually overlap currently-in-progress meta-operation I/Os, however it still may be unnecessarily conservative and slows down virtual disk I/O to an extent.

In another implementation, only writes that are targeting the same diff layer and share sectors in common are prevented from occurring concurrently. In other words, the I/O handling mechanism 110 allows concurrent reading at the same offset, that is, it allows both a meta-operation and a virtual disk I/O to read data from the same offset of the virtual disk at the same time. As can be readily appreciated, allowing concurrent reading is somewhat more complex, but also more performant. Reads can thus occur concurrently with other reads and writes, regardless of layer. Writes can occur concurrently to the same sector of different diff layers (which matters for an implementation with three total layers, as writes to the middle layer can proceed concurrently with writes to the topmost diff layer).

In one concurrent reading implementation, operation steps that involve both reads and writes, in which the read is performed before the write, may first acquire an offset range of the virtual disk for read, then upgrade the access to write before performing writes. One example of such an operation step is a merge step, in which data is read from a diff layer of a virtual disk, and then written to a parent (e.g., the base) layer of a virtual disk at the same virtual disk offset. Another example is a virtual disk read I/O, which reads from a parent layer and directly triggers an ongoing meta-operation to write the read data back to a higher ("closer") layer of the virtual disk as part of an ongoing data movement meta-operation.

In the situation where two operation steps both try to upgrade an offset range from read to write, the upgrade attempt is failed, because the purpose of an upgrade is to avoid intervening writes by anything else, and both cannot be given that privilege. The first upgrade attempt "wins" in the sense that the first upgrade attempt eventually succeeds, while other upgrade attempts fail.

When an access upgrade attempt fails, the operation step is skipped or reattempted. A skip is appropriate in cases where the step is performed opportunistically, whereas a reattempt is appropriate when the step is performed as part of a sweep over a specific portion of the virtual disk data, such as a layer of the virtual disk.

Depending on the implementation, it may be necessary to explicitly exclude concurrent reads to the same sector of the same diff layer that is currently being written, because that data is not yet fully present. This may be implicitly ensured by not marking the sectors as present in the relevant diff layer until the write to that diff layer is complete. In an alternate implementation, virtual disk reads are not granted an offset range for virtual disk read until meta-operation writes are complete.

Any portion of a meta-operation write that becomes irrelevant (covered) by a diff layer write cannot overwrite data in that covering diff layer. This needs to be dealt with in the two-layer arrangement. Note that data already covered by a diff layer write (probably) will not be read from the base layer. However, once a "read-from-base-then-write-to-diff" operation begins, the read from base will proceed, potentially concurrently with virtual disk writes to overlapping sectors. Once the base layer read has completed, the write to the diff layer occurs normally.

This write-to-diff portion of the operation needs to first acquire a write lock on the relevant sectors of the diff layer on which the write is being attempted. After the write lock is acquired, which guarantees that no virtual disk writes or conflicting reads are currently in-progress to the diff layer, the diff layer is re-checked. If a sector of the diff layer is populated, meaning that the sector of the virtual disk was written to, the meta-operation data for that sector cannot be written to the diff layer and instead is discarded. This determination is made sector-by-sector in an appropriate implementation.

If the implementation is such that diff layers are maintained at a larger granularity than per-sector, then a virtual disk write to a diff layer cannot occur until the corresponding block has been first copied from the base layer. This is additional overhead incurred the first time a virtual disk write to a block occurs, however it simplifies the locking because such operations need only consider whether a diff layer is populated on a per-block basis instead of a per-sector basis. It can be appreciated that the granularity of locking may be different than the granularity of writing; in other words locking may operate on larger offset ranges than the offset range size of a single virtual disk sector.

As a further optimization, in contrast to typical "reader-writer locks", the concurrency-prevention mechanism of the I/O handling mechanism 110 allows multiple writes to occur concurrently, as long as all the writes are from the same source (meta-operation or virtual disk I/O). In other words, the "writer" is not a single virtual disk write, but instead comprises the existence of at least one virtual disk write to the offset range, and possibly more than one.

Further contrasting this mechanism from a typical "reader-writer lock" is the way the mechanism works with offset ranges. Rather than a single lock, range-based data structures may be used to track the type of access that has been granted, the pending requests for access, and the number of sub-operations (reads or writes) that need to release their access before an access reevaluation can occur. Note that typical reader-writer locks block a thread of execution waiting for access to be granted. In contrast, the mechanism described herein does not block threads, but rather queues pending operations to a list of operations to be continued when access is granted. This facilitates a more efficient use of operating system threads.

Another optimization is to only prevent concurrency of writes when the virtual disk write can potentially be damaged by the manipulation write. In some cases, a meta-operation write cannot possibly impact a virtual disk read or write, and cannot improperly override any read or write. In these cases, and only these cases, this optimization allows the meta-operation write to proceed concurrently with a virtual disk I/O (read or write).

In one implementation, meta-operation manipulations that potentially impact the entire virtual disk, such as re-linking of virtual disk layers, are treated as an access request for a "special" range that always intersects all other ranges. An alternate implementation may use a separate reader-writer lock to prevent virtual disk I/O while changes are made to the arrangement of virtual disk layers.

Virtual disk writes can be configured to target a particular storage file or device, such as representing a virtual disk layer. A virtual disk write may target a lower layer by deleting from a higher ("closer") layer and writing to a lower layer, or by writing to both layers.

In the above-described case of having virtual disk I/O written to a base layer while a merge meta-operation is in progress, when a "deep write" writes to both a diff layer and base layer, this deep write is treated as a meta-operation itself, because the deep write cannot be performed concurrently with another virtual disk write to the same offset range. Allowing two deep writes to proceed concurrently potentially would result in the diff layer and base layer containing different data for the same offset. If this occurred in a region of the virtual disk that has already been merged, then there are incorrect semantics of the merge results, because a merge is meant to result in a base layer that represents a virtual disk with the same data as the virtual disk represented by the diff layer. If not prevented, this could subsequently result in the contents of the virtual disk changing spontaneously when the diff layer is removed, without any virtual disk write being active, which would violate disk semantics.

Turning to another aspect, virtual disk meta-operations may take a long time to complete because of the amount of data involved. For example, when copying virtual disk data to a new machine, one approach is to copy all of the virtual disk data from a source machine to the new machine, however copying all the data may not always be necessary.

In one aspect, virtual disk manipulation may manipulate only a portion of the virtual disk data (in contrast to all the virtual disk data). By way of example, various arrangements of virtual disk data are possible, and many of these arrangements split the virtual disk data into logical groups. For performance reasons, a meta-operation may be only performed on some of the data, as delineated by the groups, wherein group may refer to a virtual disk layer, or one part of a replicated (e.g., mirrored) portion of a virtual disk. For example, consider that some virtual disk data is available from more than one source, such as a remote storage device and a shared storage device. If it is more efficient to access the shared storage device, then there is no need to copy the data from the remote storage device.

Thus, the manipulation may operate only on data that is not already efficiently accessible from a specific machine, such as a copy operation that copies only data which is not already efficiently available to the destination machine. In this context, "efficiently accessible" and "efficiently available" refer to the relative speed and latency with which a specific machine, typically the destination machine of a copy or move operation, can access portions of the virtual disk. For example, a virtual disk may have two layers, where the base layer is stored on a server accessible to both a source and destination machine. A diff layer may be stored on a locally-attached drive of the source machine. The destination machine may be able to access the diff layer stored on the source machine's local drive, but it is relatively slow and inefficient because it requires ongoing handling by both the source and destination machines.

In contrast, the base layer is equally accessible to both source and target machine. In this example, the diff layer is moved, but the base layer is not moved. The source and destination machines may both participate in the move of the diff layer. Once the diff layer is moved, the destination machine has a local copy of the diff layer, and can access the base layer on the commonly-accessible server, just as the source machine can.

The manipulation of virtual disk data may not manipulate all layers of a virtual disk. In other words, a meta-operation need not touch all the virtual disk data for the described mechanisms to apply to the meta-operation. By way of one example, a diff layer may be defragmented independent of whether the base layer is also defragmented. As another example, consider that Machine A uses a virtual disk comprising a locally-stored diff layer and a remotely-stored base layer. While the disk is in use, the data in the remote base layer is copied locally to machine A, without disturbing the diff layer. Once the copy has completed, the remote base layer is no longer needed by the virtual disk. Data written by machine A is written to the diff layer, allowing the copy of the base layer data to proceed with less interference from virtual disk writes.

As yet another example, consider merging two virtual disk layers. Adjacent layers are not impacted by the merge operation, and if the merging layers are separate from the layers that service virtual disk writes, then the merge and the virtual disk writes can proceed concurrently on the same virtual disk offsets.

Still another example is a copy (or move) manipulation where only one layer of a virtual disk is copied (or moved). A move can be achieved by copying the entire layer then deleting the source layer, or it can be achieved by repeatedly copying a sub-part of the source layer, then deleting that sub-part of the source layer. In this event, the virtual disk layering mechanism services reads from the layer by using data from the source or destination (whichever has data), and services writes to the layer by forcing a move or delete of the corresponding virtual disk offset range in the source, then putting the written data in the destination location.

The manipulation of virtual disk data may only operate on data that is read by the machine currently using the virtual disk. If a machine is using a base layer that is stored remotely, the base layer reads can take a long time to service because the data needs to be transferred from remote storage. Also, the remote storage may be servicing many machines, which can further decrease performance due to high load levels on the storage.

If virtual disks are only very occasionally created for use, then an appropriate solution may be to copy the entire base layer to local storage. Once this is done, no more reads need to be serviced from remote storage, increasing performance and lowering the load on the remote storage.

However, if virtual disks are created often, the load created on the remote storage (and communications infrastructure) resulting from copying the entire base layer can overwhelm any savings due to eventually having all the base layer data stored locally. In this situation, an appropriate solution may be to have the virtual disk remain dependent on the remote base layer, but opportunistically write-back (e.g., locally cache) any data read from the remote location to local storage as part of servicing the virtual disk read. Note however that the buffer being used to read the data from storage may be writable by a less-trusted process, so a memory copy may be needed to isolate the virtual disk read from the remote read and local write. Also, as described herein, the local write is considered a meta-operation write for synchronization purposes and is not allowed to proceed concurrently with any virtual disk write or read from the same layer.

The technology described herein also coordinates the servicing of virtual disk I/Os and performance of meta-operations so that a meta-operation does not take an unbounded amount of time, thereby limiting the impact of a meta-operation on virtual disk I/O, and to ensure that a meta-operation does not unreasonably interfere with other data traffic.

This may be achieved via a number of mechanisms, including that the communications channel(s) used to perform manipulation of data, and the communications channel(s) used to service virtual disk reads and writes, may be separate. Separate communication channels can help reduce the impact of the meta-operation on other data traffic, including virtual disk I/O traffic. The channels also may change before manipulation of virtual disk data is complete. Note that the manipulation of data is independent of any data transport and may use any data communications technology, whether intended for local or networked use, such as Ethernet, Fibre-channel, wireless networking, SATA, SAS, and so forth.

Although separate communications channels may be used for performing a meta-operation and servicing virtual disk I/Os, synchronization of writes is still maintained. Also, communications traffic generated in manipulating data may be throttled or prioritized to explicitly manage the degree of disruption to other communications traffic sharing the same communications medium.

For example, meta-operation-related communications traffic can be throttled so that less network capacity is used for meta-operation I/Os. This reduces the impact on other traffic, but may also unnecessarily slow down meta-operation progress. An alternative approach is to tag the meta-op I/O data traffic with a lower traffic priority than other data traffic, provided the appropriate network infrastructure is available. To ensure some progress is made on the meta-operation, some amount of throttled meta-operation I/O traffic may be tagged with normal priority. The end result of tagging with lower priority is that otherwise unused network capacity is used to make progress on "background" meta-operations. Foreground meta-operations that are performed as part of a virtual disk I/O are tagged with normal priority to avoid stalling virtual disk I/O behind other normal priority traffic.

Meta-operation reads and writes may be throttled or prioritized to explicitly manage the performance impact of a meta-op on virtual disk I/O (reads and writes) and other storage I/O (reads and writes). Whether or not a shared network is used, there is also a performance impact on the storage device itself due to the meta-operation. This may be mitigated in a manner similar to network usage, e.g., the meta-operation I/Os may be throttled, or they may be explicitly prioritized against other I/O on the same storage device to allow the storage device to remain responsive for other I/O.

In general, virtual disk reads have priority over meta-operation I/Os. However, at times virtual disk writes may be throttled, such as to avoid any situation in which ongoing virtual disk writes may potentially prevent virtual disk manipulation from ever completing. For example, a tree of diff files may be built by snapshotting each diff file that contains the writes, and creating a new diff file for any new writes; this may be done to move the diff files (and possibly the base file) to a destination device, with the goal of having smaller and smaller diff files over time such that the last move of the (relatively small) diff file containing the most recent writes is rapidly moved. However, if the writes are coming in too quickly, a newer diff file may grow relative to the snapshotted diff file instead of shrinking, whereby the goal may never be achieved. Throttling the writes prevents such growing. When the manipulation of virtual disk data is the moving or copying of data from a source to a destination, this throttling can include "writing through" virtual disk writes to the destination, to prevent a virtual disk write from creating additional work for the virtual disk manipulation faster than the virtual disk manipulation can complete work.

The throttling of virtual disk writes may be different from throttling meta-operation I/Os. When throttling meta-operation I/Os, a general goal is to reduce the impact of the meta-operation on other I/Os and other network traffic. In contrast, virtual disk write throttling applies to virtual disk I/Os rather than meta-operation I/Os. If virtual disk I/Os were allowed to proceed at their maximum rate, in some cases the virtual disk I/O may undo some of the progress made by a meta-operation. If virtual disk writes are able to undo progress faster than the meta-operation can make progress, the meta-operation will likely not complete.

One example is a merge of data from a diff layer into a base layer. If the merge meta-operation is moving data from the diff layer into the base layer, and virtual disk writes are still directed to the diff layer, then it may be possible for virtual disk writes to write to the diff layer faster than the meta-operation can move data from the diff layer to the base layer. In this case, the meta-operation may never finish.

Another example is a copy of a layer from one location to another, with ongoing virtual disk writes to the same layer. In this case, virtual disk writes to the source location may outpace the copying of data from source location to target location.

Various ways to address this situation may be considered to be a form of throttling of virtual disk writes. One way is to enforce that virtual disk writes never "undo" work already done by a meta-operation, by adjusting the target location for virtual disk writes to write to the "destination" location instead of, or in addition to, any "source" location. In the first example above of a merge, this means the virtual disk write targets the base layer instead of the diff layer. This requires that the virtual disk write also "un-cover" the base layer in the offset range changed by the write, by deleting data from the diff layer. In the second example above of a layer copy operation, the virtual disk write is written to both the source and destination locations. This ensures that any already-copied regions of the virtual disk remain identical as further writes occur.

An alternative way to address the situation is to explicitly throttle virtual disk writes. This ensures that the meta-operation will eventually win over virtual disk writes. In one implementation, a virtual disk write "allowance" value is maintained per virtual disk, which starts with a small value (not quite zero) to avoid stalling virtual-disk writes as the meta-operation is getting started. Every time a certain amount of progress is made by the ongoing meta-operation, the allowance number is increased by some amount, e.g., less than the initial value. When a virtual disk write is initiated, the write first acquires some allowance before it can be issued. If the allowance value is too near zero, the virtual disk write waits in line until the allowance value is sufficiently large to allow the virtual disk write to allocate some of the allowance, and then proceeds. While the allowance value is below a pre-set threshold, the meta-operation is allowed to run non-throttled to build up the allowance value and avoid overly slowing down any ongoing virtual disk writes. In this alternate solution, the virtual disk writes also inform the ongoing meta-operation of any written regions in the source layer, because the meta-operation may have already processed those regions, and now needs to process them again to account for the changes made by the virtual disk write. In a further alternate implementation, an amount of extra data (extra work) produced by virtual disk writes and not yet processed by the ongoing meta operation is tracked, and virtual disk writes are throttled to prevent this amount of extra data produced by virtual disk writes and not yet processed by the ongoing meta operation from growing beyond a set limit. The meta-operation can process a portion of the extra data produced by writes to reduce the tracked value, such that virtual disk writes can again proceed.

Note that in the "never-undo-work" approach, a virtual disk write may need to target remote storage instead of local storage, which increases the latency of virtual disk writes, and thereby unnecessarily reduces performance. In the "explicitly-throttle-virtual-disk-writes" approach, sometimes the meta-operation is able to stay sufficiently ahead of virtual disk writes such that virtual disk writes can immediately proceed without waiting for remote writing of data to complete. This allows virtual disk writes to target local storage with low latency, improving performance. For workloads that tend to issue virtual disk writes one at a time, this approach may be particularly useful. The meta-operation may be able to achieve higher throughput writing to remote locations because it may be able to issue many writes concurrently, better hiding the latency of remote storage.

A virtual disk meta-operation may change the set of files or devices used to store virtual disk data. When this change occurs, in general, the I/O handling mechanism begins holding any I/Os that may use the old storage file or device, waits for in-flight I/Os using the old storage file or device to complete, changes to use the new storage file or device, and stops holding I/Os (letting them be processed again).

More particularly, depending on the meta-operation, the I/O handling mechanism takes different approaches. A first approach is to begin holding any I/Os that may use the old storage file or device, wait for in-flight I/Os using the old storage file or device to complete, change data structures to use the new storage file or device, stop holding I/Os (letting them be processed again), and cleans up the old file or device (because it is no longer in-use by any I/O).

Another approach begins holding any I/Os that may use the old storage file or device, waits for I/Os that are being initiated to the old storage file or device to be done initiating, changes data structures to use the new storage file or device for newly-initiating I/O, stops holding I/Os (letting them be initiated again), waits for old I/O that was using the old storage file or device to be completed, and then cleans up the old file or device (because it is no longer in-use by any I/O). This other approach is somewhat more complex, but has less impact on performance, and is only usable for meta-operations that do not write to any data being operated on, or meta-operations that write to all copies of any data being operated on, or layers that service virtual disk reads but not writes. The first approach works for any meta-operation.

Turning to another aspect, virtual disk meta-operations may manipulate de-duplication data structures to achieve accelerated performance of the meta-operation. In general, by manipulating de-duplication data structures, a logical copy of data can be performed without actually copying any data. A move offload of the data can directly provide benefits by being placed in a low-level transaction along with other storage operations. Alternately, a logical move of the data can be achieved by performing a copy-update-delete in a logical transaction implemented outside the storage device. Such copy offload or move offload operations may be available for use by virtual disks in whole or part (as determinable via commands in SCSI and Fibrechannel protocols). Note that a move deletes the source data, whereas a copy does not, instead leaving deletion as an option. For example, a transaction implemented outside the storage device may be set up to "move" data by "copy-update-delete" operations, and the operation can go back to the source data if the transaction fails. Note that delete is an unmap (SCSI) or a trim (ATA) as appropriate for the underlying storage.

Copy offload copies blocks, which along with moving blocks or deleting blocks is very efficient because it basically adjusts pointers rather than copying the data itself. In one implementation, if a meta-operation may be done by copy offload (or at least in part), then the meta-operation leverages this feature.

A number of virtual disk meta-operations can benefit from the underlying de-duplication capability of the hardware and/or software, including compaction, defragmentation, merge, and convert (that is, to a new layout, such as with different block sizes). Other operations include "lift" and "drop" operations, which are related to converting one virtual disk representation to another, e.g., a logical unit to a VHD file (lift), or vice versa (drop).

For example, consider defragmentation of a virtual disk with one or more layers above a base physical layer. In such a stack of layers, there may be many ways that a virtual disk may be fragmented, e.g., as part of a file system, in blocks, in a hosting system, and so on. A scramble map basically is used to track how the data is actually arranged versus how the data is to be arranged once defragmented. Heretofore, defragmentation was done by actual copying of the data based upon the scramble map, which often resulted in copying the same data more than once as each layer was defragmented.

If copy offloads (or move offloads) are used instead, e.g., from the topmost layer down to the base physical layer, layers above the base physical layer may be defragmented by data structure manipulation, without any copying of the actual data. This is very rapid, and is accomplished without severely impacting performance. Note that as each layer is defragmented, the scramble map of one or more lower layers changes, and copy offload defragmentation effectively pushes the scramble map down one layer (or more), until only the base physical layer is scrambled. Then, the only actual data copying (or moving) is done at the base physical layer, which can be scheduled in whole or in part as desired.

Figure 4:
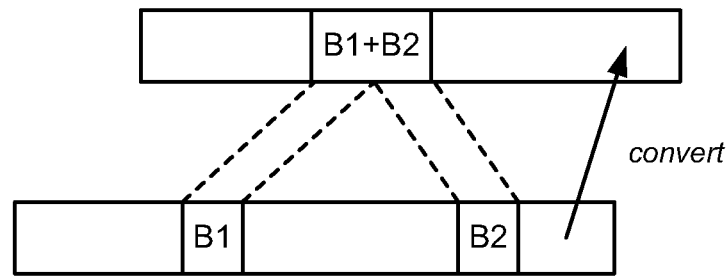
FIG. 4 is a representation of converting a virtual disk via de-duplication data structure manipulation.

Another meta-operation that benefits from copy or move offload is when converting one virtual disk representation to another. For example, FIG. 4 shows converting blocks (B1 and B2) to a different block size (B1+B2). This may be done without copying data, but rather by manipulating pointers to logically combine the two blocks into a single block. Note that certain forms of virtual disk metadata (as well as payload data) may also be involved in such a zero-physical-copy conversion using this technique, such as sector bitmaps.

Figure 5:
FIG. 5 is a representation of lifting or dropping a virtual disk via de-duplication data structure manipulation.

FIG. 5 shows another set of meta-operations, namely lift and drop, which converts a set of related virtual disk layer files to or from a de-duplication-capable storage pool, avoiding the need for copying bulk data, and pre-establishing logically duplicated data. In general, this provides for using the advantages provided at different layers, such as by dropping to the lower (block) layer to do some work, and then lifting back up to a higher (file) layer for ease of management.

By way of example, a virtual disk may have more than one representation, corresponding to nested logical units, e.g., a LUN below a VHD (virtual hard disk) formatted file (or a file of another format). In actuality, the units have different data structures, but share the same underlying storage for the data payload. Lift or drop using copy or move offload basically changes one to the other, and because of the sharing, performs the lift or drop by simply changing de-duplication data structures so that the pointers point to the correct offsets.

Note that along with payload, metadata may be also dropped and lifted, e.g., an alternate payload stream, or bitmaps. Moreover, some or all of the metadata may be persisted, such as to recreate the layers, including metadata, as they existed at a given time.

Figure 6:
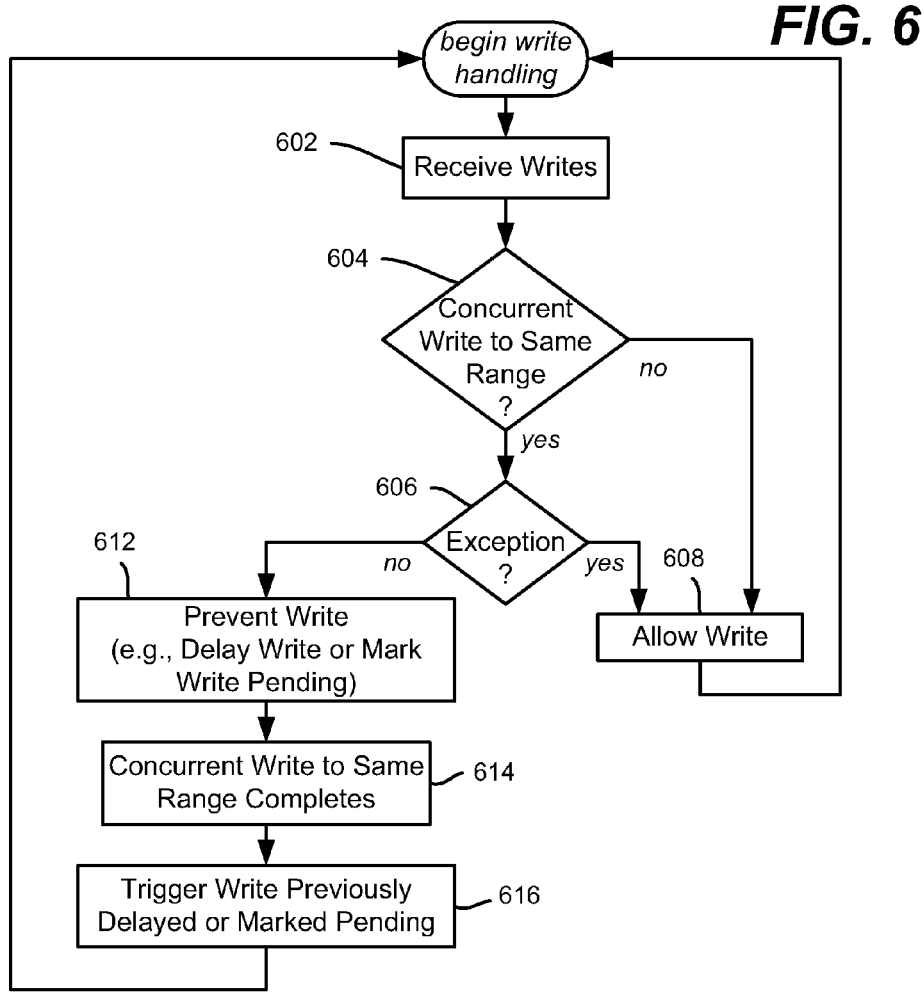
FIG. 6 is a flow diagram showing example steps that may be taken to handle writes such that virtual disk reads and writes may continue while performing a meta-operation on the virtual disk.

FIG. 6 summarizes general example operations of handling a write, beginning at step 602 where a write to a virtual disk is received. Step 604 determines whether the write is concurrent with any other write to overlapping layers at a same virtual disk offset range. If not, step 604 branches to step 608 and the write is allowed. Note that this may be done by queuing pending operations to a list of operations to be continued when access is granted as described above.

Step 606 is an optional step that provides for some optimizations if desired. In general, step 606 determines whether there is an exception that allows the meta-operation write. As described above, such possible exceptions include determining that the virtual disk write cannot be damaged by the write, determining that the write and the other write are from a same source, or determining that the write is to a closer layer and a targeted layer overridden by the closer layer. If there is an exception, step 606 allows the write at step 608. Otherwise the write is prevented at step 612; prevention may be accomplished by locking, or by marking/delaying, and queuing pending operations to a list of operations to be continued when access is granted as described above. The conflicting write completes at step 614, and then the write previously delayed or marked pending is triggered at step 616. The diagram shows the steps taken to process a single write, however it can be readily appreciated that other writes may be processed according to the steps in FIG. 6 during the time interval between steps 612 and 614.

Figure 7:
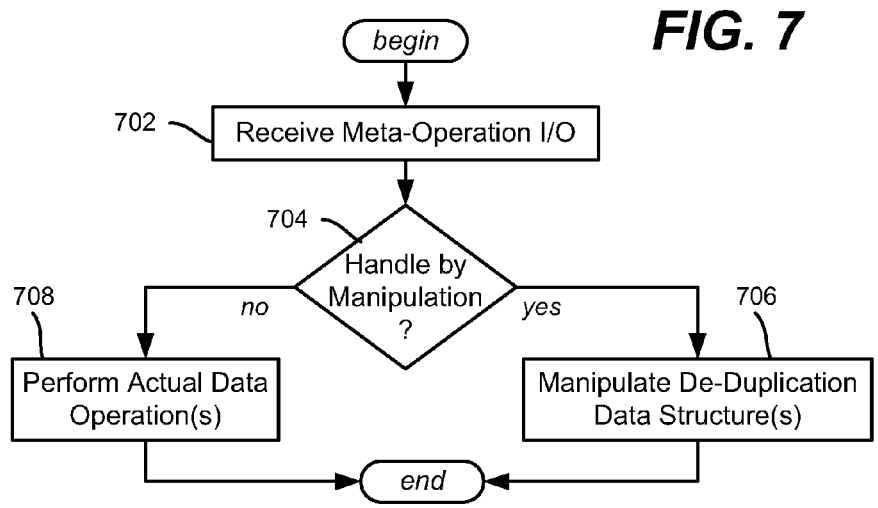
FIG. 7 is a flow diagram showing example steps that may be taken to handle meta-operation I/O by de-duplication data structure manipulation when available.

FIG. 7 summarizes general example operations of handling meta-operation I/Os when the received I/O (step 702) may be accomplished by de-duplication data structure manipulation, as determined by step 704. If so, step 706 performs at least part of the meta-operation by such manipulation, e.g., via a copy offload operation, an update operation, a delete operation, and/or a move offload operation. Otherwise the meta-operation I/O is handled at step 708 in the prior, less efficient manner, e.g., by actual copying/moving/deleting data.

Exemplary Operating Environment

Figure 8:
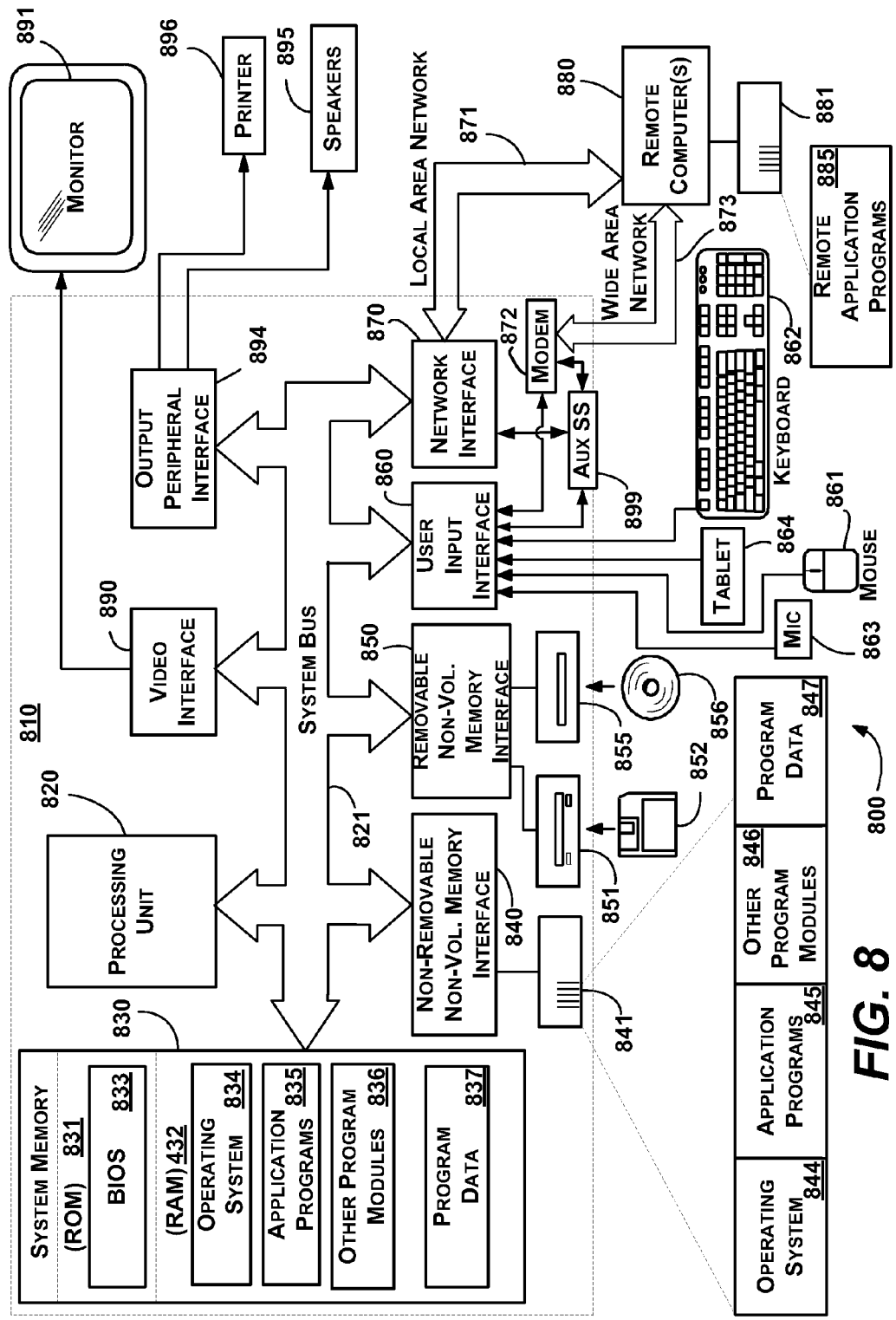
FIG. 8 shows an illustrative example of a computing environment into which various aspects of the present invention may be incorporated.

FIG. 8 illustrates an example of a suitable computing and networking environment 800 on which the examples of FIGS. 1-7 may be implemented. The computing system environment 800 is only one example of a suitable computing environment and is not intended to suggest any limitation as to the scope of use or functionality of the invention. Neither should the computing environment 800 be interpreted as having any dependency or requirement relating to any one or combination of components illustrated in the exemplary operating environment 800.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 8, an exemplary system for implementing various aspects of the invention may include a general purpose computing device in the form of a computer 810. Components of the computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 810 typically includes a variety of computer-readable media. Computer-readable media can be any available media that can be accessed by the computer 810 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 810. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 830 includes computer storage media in the form of volatile and/or nonvolatile memory such as read only memory (ROM) 831 and random access memory (RAM) 832. A basic input/output system 833 (BI/OS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836 and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media, described above and illustrated in FIG. 8, provide storage of computer-readable instructions, data structures, program modules and other data for the computer 810. In FIG. 8, for example, hard disk drive 841 is illustrated as storing operating system 844, application programs 845, other program modules 846 and program data 847. Note that these components can either be the same as or different from operating system 834, application programs 835, other program modules 836, and program data 837. Operating system 844, application programs 845, other program modules 846, and program data 847 are given different numbers herein to illustrate that, at a minimum, they are different copies. A user may enter commands and information into the computer 810 through input devices such as a tablet, or electronic digitizer, 864, a microphone 863, a keyboard 862 and pointing device 861, commonly referred to as mouse, trackball or touch pad. Other input devices not shown in FIG. 8 may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. The monitor 891 may also be integrated with a touch-screen panel or the like. Note that the monitor and/or touch screen panel can be physically coupled to a housing in which the computing device 810 is incorporated, such as in a tablet-type personal computer. In addition, computers such as the computing device 810 may also include other peripheral output devices such as speakers 895 and printer 896, which may be connected through an output peripheral interface 894 or the like.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include one or more local area networks (LAN) 871 and one or more wide area networks (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860 or other appropriate mechanism. A wireless networking component such as comprising an interface and antenna may be coupled through a suitable device such as an access point or peer computer to a WAN or LAN. In a networked environment, program modules depicted relative to the computer 810, or portions thereof, may be stored in the remote memory storage device. By way of example, and not limitation, FIG. 8 illustrates remote application programs 885 as residing on memory device 881. It may be appreciated that the network connections shown are exemplary and other means of establishing a communications link between the computers may be used.

An auxiliary subsystem 899 (e.g., for auxiliary display of content) may be connected via the user interface 860 to allow data such as program content, system status and event notifications to be provided to the user, even if the main portions of the computer system are in a low power state. The auxiliary subsystem 899 may be connected to the modem 872 and/or network interface 870 to allow communication between these systems while the main processing unit 820 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a system comprising, at least one processor, a memory communicatively coupled to the at least one processor and including components comprising, a virtual disk comprising at least two overlapping layers, and a mechanism configured to handle I/O of a meta-operation that manipulates data of the virtual disk concurrent with servicing virtual disk read and write I/O of the virtual disk, including by allowing at least one meta-operation write to a virtual disk offset range concurrent with a virtual disk write to an overlapping virtual disk offset range when the virtual disk write cannot be damaged by the at least one meta-operation write, or when at least two writes are from a same source.

2. The system of claim 1 wherein the meta-operation comprises copying, moving, deleting, merging, compressing, defragmenting, cryptographic signing, lifting, dropping, converting, or compacting virtual disk data.

3. The system of claim 1 wherein the mechanism is further configured to prevent concurrent meta operation writes and virtual disk writes to the at least one overlapping layer at a same virtual disk offset range.

4. The system of claim 1 wherein the meta-operation manipulates less than all of the virtual disk data.

5. The system of claim 1 wherein the mechanism is further configured to coordinate the servicing of virtual disk I/Os with meta-operation performance to allow the meta-operation to complete, to control virtual disk reads and writes versus meta-operation reads and writes, or to control interference of the meta-operation with other data traffic, or any combination of allowing the meta-operation to complete, controlling virtual disk reads and writes versus meta-operation reads and writes, or controlling interference of the meta-operation with other data traffic.

6. The system of claim 1 wherein the mechanism is further configured to throttle or prioritize, or both throttle and prioritize, virtual disk reads and writes to allow the meta-operation to complete.

7. The system of claim 1 wherein the mechanism is further configured to throttle or prioritize, or both throttle and prioritize, meta-operation reads and writes to control interference with virtual disk reads and writes, or to control interference of the meta-operation with other data traffic, or to both control interference with virtual disk reads and writes and to control interference of the meta-operation with other data traffic.

8. The system of claim 1 wherein one or more communication channels used by the meta operation are separable or changeable, or both separable and changeable, with respect to one or more communication channels used in servicing the virtual disk reads and writes.

9. The system of claim 1 wherein the meta-operation is performed at least in part by manipulating one or more de-duplication data structures.

10. The system of claim 9 wherein the meta-operation manipulates the one or more de-duplication data structures to compact the virtual disk, defragment the virtual disk, merge two or more layers of the virtual disk, convert the virtual disk to a different layout, lift the virtual disk, or drop the virtual disk.

11. The system of claim 9 wherein the meta-operation manipulates the one or more de-duplication data structures by at least one copy offload operation, at least one update operation, at least one delete operation, or at least one move offload operation, or any combination of at least one copy offload operation, at least one update operation, at least one delete operation, or at least one move offload operation.

12. The system of claim 9 wherein the meta-operation copies or moves, or both copies and moves, both payload data and metadata.

13. In a computing environment, a method employing at least one processor to perform steps comprising, receiving a meta-operation write at a virtual disk having at least two layers of backing data in time order, determining whether the meta-operation write is concurrent with any other write to overlapping layers at a same virtual disk offset range, and if not, allowing the write to proceed, and changing a set of one or more files or devices, used to store virtual disk data, to a new set, including:
 holding I/Os that use the set of one or more files or devices, waiting for in-flight I/Os using the set of one or more files or devices to complete, changing to use the new set of one or more files or devices, and stopping holding of the I/Os to be processed with respect to the new set.

14. The method of claim 13 further comprising, determining whether there is an exception that allows the meta-operation write, including determining that the virtual disk write cannot be damaged by the write, or determining that the write and the other write are from a same source, and if so, allowing the write, and if not, preventing the write.

15. The method of claim 13 further comprising, throttling the write and other I/O of the meta-operation, or prioritizing the write and other I/O of the meta-operation, or both throttling and prioritizing the write and other I/O of the meta-operation to control interference with virtual disk reads and writes, or to control interference of the meta-operation with other data traffic, or both to control interference with virtual disk reads and writes and to control interference of the meta-operation with other data traffic.

16. The method of claim 13 further comprising, throttling the servicing of virtual disk writes to allow a meta-operation that corresponds to the meta-operation write to complete.

17. The method of claim 13 further comprising if the meta-operation write is concurrent with a virtual disk write, preventing the meta-operation write unless the virtual disk write cannot damage the meta-operation write.

18. One or more computer-readable storage media having computer-executable instructions, which when executed perform steps, comprising: receiving I/O corresponding to a meta-operation on a virtual disk; and determining whether the I/O can be handled by manipulating one or more de-duplication data structures, and if so, manipulating the one or more de-duplication data structures to perform at least part of the meta-operation on a virtual disk offset range concurrent with a virtual disk write to an overlapping virtual disk offset range when the virtual disk write cannot be damaged by at least one meta-operation write, or when at least two writes are from a same source.

19. The one or more computer-readable storage media of claim 18 wherein the meta-operation manipulates the one or more de-duplication data structures to compact the virtual disk, defragment the virtual disk, merge two or more layers of the virtual disk, convert the virtual disk to a different layout, lift the virtual disk, or drop the virtual disk.

20. The one or more computer-readable storage media of claim 18 wherein manipulating the one or more de-duplication data structures comprises performing at least one copy offload operation, at least one update operation, at least one delete operation, or at least one move offload operation, or any combination of performing at least one copy offload operation, at least one update operation, at least one delete operation, or at least one move offload operation.

* * * * *